United States Patent
Salter et al.

(10) Patent No.: US 11,192,528 B2
(45) Date of Patent: Dec. 7, 2021

(54) VEHICLE LIGHT ASSEMBLY AND METHOD OF CONTROLLING SAME

(71) Applicant: Ford Global Technologies, LLC, Dearborn, MI (US)

(72) Inventors: Stuart C. Salter, White Lake, MI (US); Paul Kenneth Dellock, Northville, MI (US); John Shutko, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 16/715,218

(22) Filed: Dec. 16, 2019

(65) Prior Publication Data

US 2020/0114882 A1    Apr. 16, 2020

Related U.S. Application Data

(62) Division of application No. 15/603,807, filed on May 24, 2017, now Pat. No. 10,562,501.

(51) Int. Cl.
| | |
|---|---|
| *B60S 1/60* | (2006.01) |
| *B60Q 1/14* | (2006.01) |
| *B60Q 1/50* | (2006.01) |
| *B60Q 1/00* | (2006.01) |
| *B60Q 11/00* | (2006.01) |
| *B60S 1/48* | (2006.01) |
| *B60S 1/52* | (2006.01) |

(52) U.S. Cl.
CPC ............ *B60S 1/603* (2013.01); *B60Q 1/0005* (2013.01); *B60Q 1/0023* (2013.01); *B60Q 1/0064* (2013.01); *B60Q 1/1423* (2013.01); *B60Q 1/50* (2013.01); *B60Q 11/005* (2013.01); *B60S 1/481* (2013.01); *B60S 1/52* (2013.01)

(58) Field of Classification Search
CPC . B60S 1/603; B60S 1/481; B60S 1/52; B60Q 1/0005; B60Q 1/0023; B60Q 1/0064; B60Q 1/1423; B60Q 1/50; B60Q 1/005; B60Q 11/005
USPC .................................................. 134/18, 56 R
See application file for complete search history.

(56) References Cited

U.S. PATENT DOCUMENTS

| | | | |
|---|---|---|---|
| 3,117,727 A * | 1/1964 | Pollock ................... | B60S 1/528 239/284.2 |
| 3,609,450 A * | 9/1971 | Hart ......................... | B60S 1/52 315/82 |
| 6,189,808 B1 | 2/2001 | Daniels et al. | |
| 7,629,558 B2 | 12/2009 | Petrenko | |

(Continued)

FOREIGN PATENT DOCUMENTS

| | | |
|---|---|---|
| CN | 201298942 Y | 8/2009 |
| DE | 202012005908 U1 | 8/2012 |

(Continued)

*Primary Examiner* — Tinsae B Ayalew
(74) *Attorney, Agent, or Firm* — David Coppiellie; Price Heneveld LLP

(57) ABSTRACT

A vehicle light assembly is provided. The vehicle lighting assembly includes a housing, a light source, a lens disposed in front of the light source, a light sensor disposed outside the lens for sensing light intensity of light output from the lens, and a controller controlling the light source to adjust intensity of the light based on the sensed light intensity. The controller may also control a lens cleaner based on the sensed light intensity.

19 Claims, 6 Drawing Sheets

(56) References Cited

U.S. PATENT DOCUMENTS

| | | |
|---|---|---|
| 9,371,032 B2 | 6/2016 | Veerasamy |
| 2007/0045282 A1 | 3/2007 | Petrenko |
| 2009/0010494 A1 | 1/2009 | Bechtel et al. |
| 2011/0050102 A1* | 3/2011 | Le Bars ................ B60Q 1/085 |
| | | 315/82 |
| 2015/0016133 A1 | 1/2015 | Erdl et al. |

FOREIGN PATENT DOCUMENTS

| | | |
|---|---|---|
| DE | 102012012014 A1 | 1/2013 |
| FR | 2897321 A1 | 2/2006 |
| KR | 20120050268 A | 5/2012 |
| WO | 1998054030 A1 | 12/1998 |

* cited by examiner

VEHICLE LIGHT ASSEMBLY AND METHOD OF CONTROLLING SAME

CROSS-REFERENCE TO RELATED APPLICATION

This patent application is a division of U.S. patent application Ser. No. 15/603,807, which was filed on May 24, 2017, entitled "VEHICLE LIGHT ASSEMBLY AND METHOD OF CONTROLLING SAME," now U.S. Pat. No. 10,562,501, the entire disclosure of which is hereby incorporated herein by reference.

FIELD OF THE INVENTION

The present invention generally relates to vehicle lighting, and more particularly relates to vehicle lighting assemblies that sense and control the light output.

BACKGROUND OF THE INVENTION

Automotive vehicles are commonly equipped with various exterior lighting assemblies including vehicle headlights at the front of the vehicle and taillights at the rear of the vehicle. In addition, other light assemblies, such as light bars and halo lights have been proposed as indicator lights to identify or communicate to a user a task such as a color code or sequence, such as for a ride call service. Vehicle exterior light assemblies typically include a light source disposed within a housing and having an exterior lens. Some light assemblies experience reduced light output caused by moisture accumulation in the form of snow and ice accumulating on the exterior lens in cold weather, dirt accumulating on the outside of the lens, wear and damage on the lens and heating/aging of the light sources, all of which may reduce the light output. It may be desirable to provide for an enhanced vehicle light assembly that compensates for reduced light output.

SUMMARY OF THE INVENTION

According to one aspect of the present invention, a vehicle light assembly is provided. The vehicle light assembly includes a housing, a light source, and a lens disposed in front of the light source. The vehicle light assembly also includes a light sensor for sensing light intensity of light output from the lens, and a controller controlling the light source to adjust intensity of the light based on the sensed light intensity.

Embodiments of the first aspect of the invention can include any one or a combination of the following features:
  the light assembly includes a lens cleaner adapted to clean the lens, wherein the controller controls the lens cleaner based on the sensed light intensity;
  the lens cleaner comprises a spray washer for spraying liquid on the lens;
  the controller adjusts current applied to the light source to adjust the intensity;
  the light sensor is disposed outside the lens;
  the light sensor is disposed at least partially in front of the lens;
  the light sensor comprises a light pipe;
  light sensor comprises an extendable portion that extends and retracts; and
  the light assembly includes an optical silicone layer formed on the lens.

According to another aspect of the present invention, a vehicle light assembly is provided. The vehicle light assembly includes a housing, a light source, and a lens disposed in front of the light source. The vehicle light assembly also includes a light sensor disposed outside the lens for sensing light intensity of light output from the lens, and a controller controlling a lens cleaner adapted to clean the lens, wherein the controller controls the lens cleaner based on the sensed light intensity.

Embodiments of the second aspect of the invention can include any one or a combination of the following features:
  the controller further controls the light source to adjust intensity of the light based on the sensed intensity;
  the lens cleaner comprises a spray washer for spraying liquid on the lens;
  the light sensor is disposed at least partially in front of the lens;
  the light sensor comprises a light pipe;
  the light sensor comprises an extendable portion that extends and retracts; and
  the light assembly includes an optical silicone layer formed on the lens.

According to a further aspect of the present invention, a method of controlling a vehicle exterior light assembly is provided. The method includes the steps of generating a light output through a lens from a light source, sensing light output emitted from the lens with a light sensor, and adjusting with a controller intensity of light generated by the light source based on the sensed light intensity.

Embodiments of the third aspect of the invention can include any one or a combination of the following features:
  The method activates a lens cleaner to clean the lens, wherein the controller controls the lens cleaner based on the sensed light intensity;
  the lens cleaner comprises a spray washer for spraying liquid on the lens; and
  the light sensor is disposed outside the lens.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
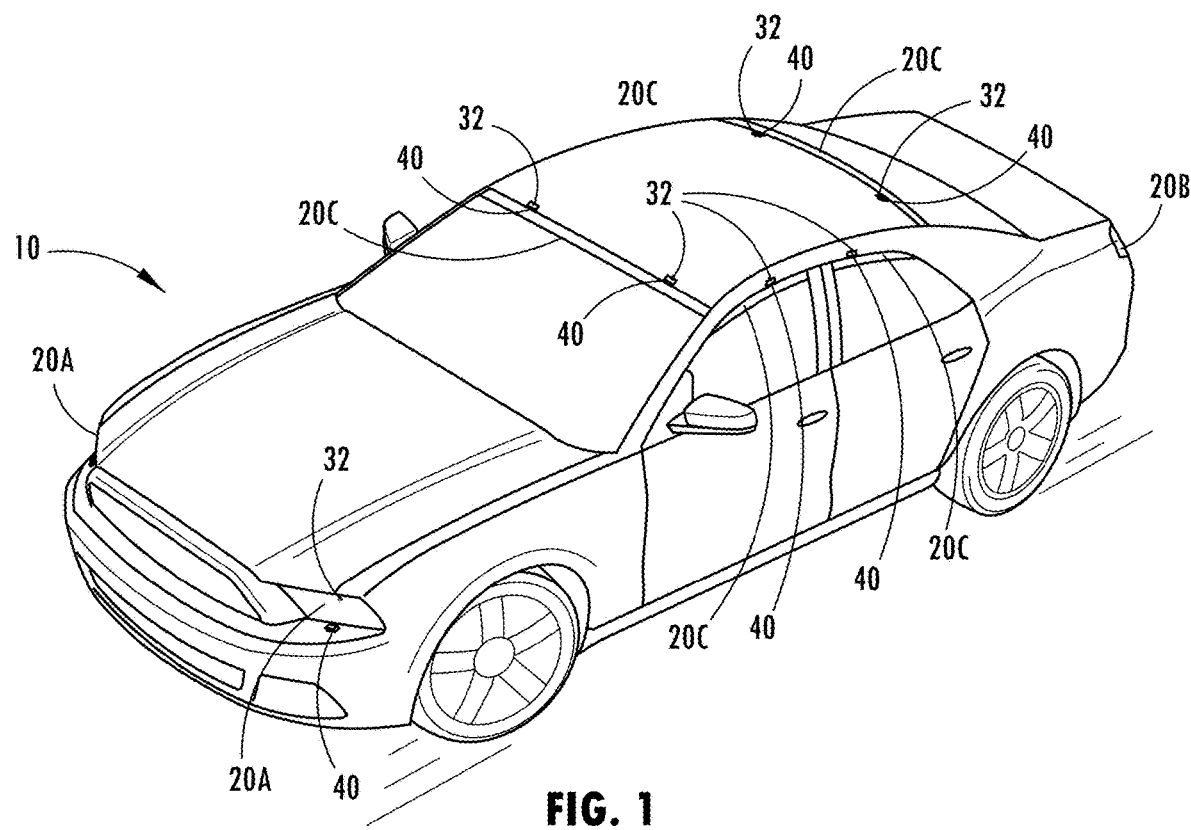
FIG. 1 is a front perspective view of a vehicle equipped with various exterior lighting assemblies having light intensity sensing and control, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
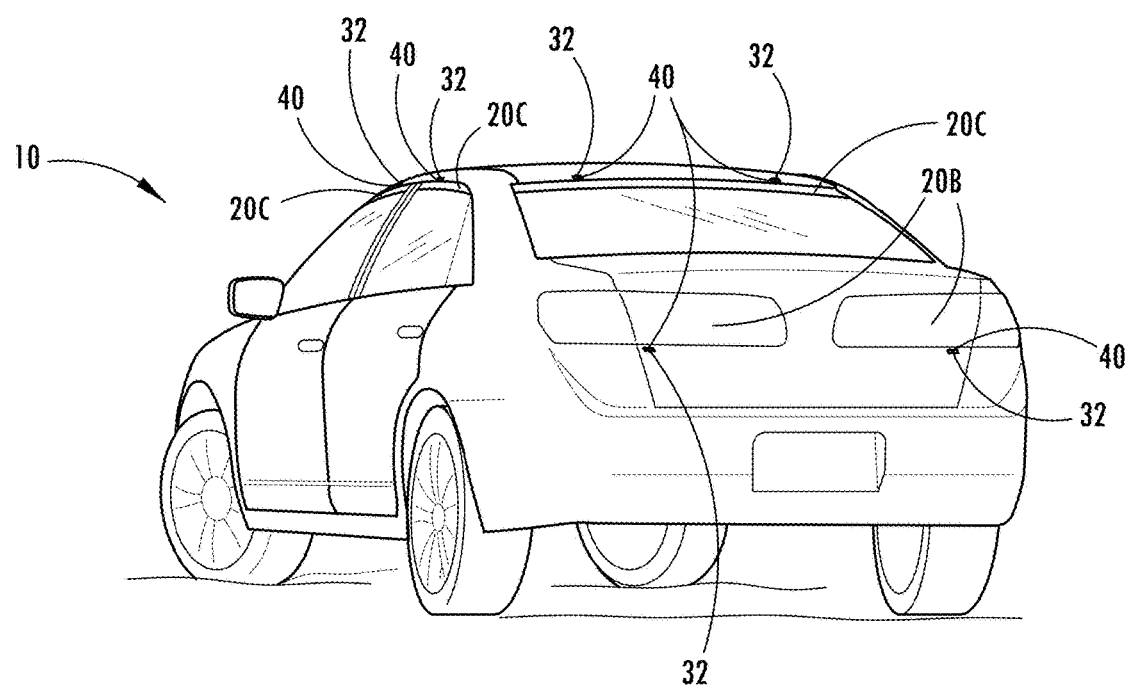
FIG. 2 is a rear perspective view of the vehicle further illustrating exterior light assemblies on the vehicle of FIG. 1 that may include light sensing and control.

Referring to FIGS. 1 and 2, a wheeled motor vehicle 10 is generally illustrated having light sensing and control provided in one or more vehicle exterior light assemblies. The vehicle 10 is shown having a pair of vehicle headlight assemblies 20A located at the front left and right corners of the vehicle 10 for providing headlight illumination forward of the vehicle 10. The vehicle 10 is also shown having a pair of vehicle taillight assemblies 20B located at the rear left and right corners of the vehicle 10 for providing taillight illumination generally rearward of the vehicle. Further, the vehicle 10 is also shown having a plurality of indicator light assemblies 20C located proximate to the roofline of the vehicle 10. The indicator lights 20C may include a plurality of light bars or halo lights that extend above the windshield, the rear window, and the side windows and serve as indicator lights. The indicators lights 20C may illuminate in various colors, patterns, and sequences to identify and communicate a condition or a task, such as by illuminating a color code or sequence for a vehicle ride call service.

Any of the headlight assemblies 20A, taillight assemblies 20B and indicator light assemblies 20C may be configured to include a light sensor 32 that senses light output emitted from the respective light assemblies, a controller that adjusts light intensity output from the light assembly based on the sensed light, and a lens cleaner such as a spray washer 40 for removing dirt and snow/ice from the respective lighting assemblies. The light assembly 20 shown in FIGS. 3-6 may represent a headlight assembly, however, the light assembly 20 may be any of light assemblies 20A, 20B and 20C. It should be appreciated that while each of the light assemblies 20 shown and described herein in detail may have an appearance of a headlight assembly employing the light sensor 32 and spray washer 40, the depicted light assembly 20 may be configured as the taillight assemblies 20B and indicator light assemblies 20C and likewise may be configured to include the light sensor 32, controller and spray washer 40 for sensing light output and removing dirt and ice/snow from the exterior surface of the lens.

Figure 3:
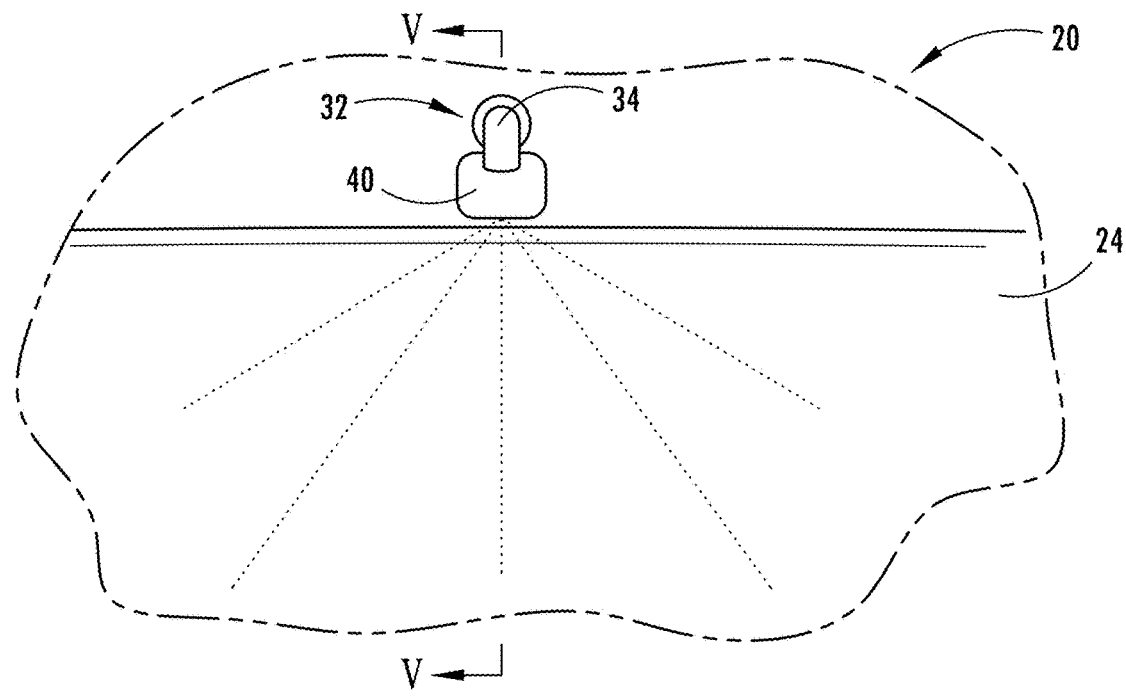
FIG. 3 is an enlarged front view of one of the light assemblies shown in FIGS. 1 and 2 with a light sensor and washer, according to one embodiment.

Referring to FIG. 3, one of the light assemblies 20A-20C is illustrated or presented by light assembly 20 having a light sensor 32 and lens cleaner in the form of a spray washer 40 positioned generally above or on top of the light assembly 20. The light assembly 20 may be a headlight 20A, a taillight assembly 20B, an indicator light assembly 20C or other exterior light assembly on the vehicle 10. In this embodiment, the light sensor 32 and spray washer 40 are positioned together generally above the outer lens 24 of the light assembly 20 to sense light output from the light assembly 20 and to apply liquid spray wash or cleaner to wash the outer lens 24 of the light assembly 20. The light sensor 32 and spray washer 40 may be arranged on an actuatable or movable pop out unit that may be motor actuated to deploy the sensor 32 and spray washer 40 outward to an extended use position and inward to a retracted stored position, according to one embodiment. When the light sensor 32 detects a reduced light output from the light assembly 20, a light source within the light assembly 20 may be controlled to generate more light output by adjusting the input current or pulse width modulation input, and the spray washer 40 may be activated to remove dirt, ice, snow and other material from the outer lens 24 that may be blocking the light output.

Figure 5:
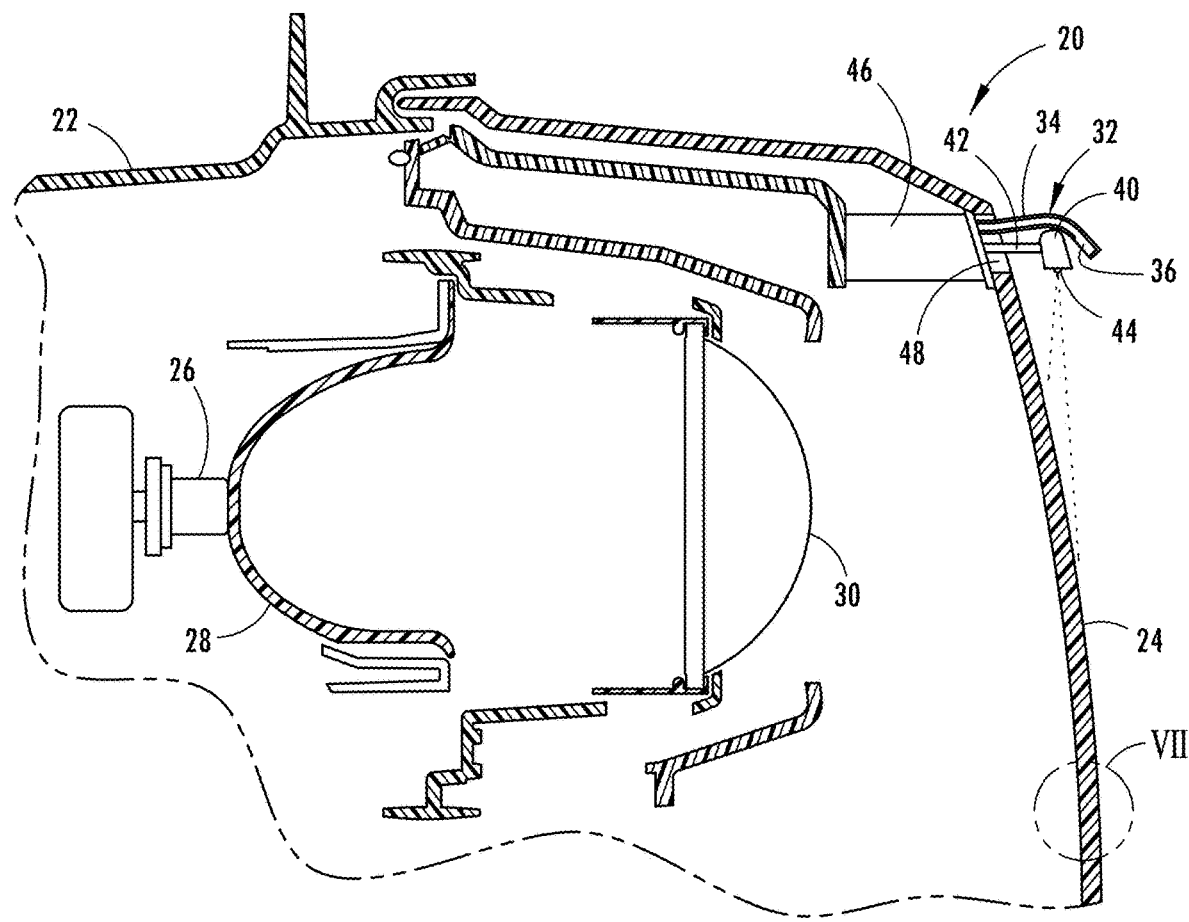
FIG. 5 is a cross-sectional view of the vehicle light assembly taken through line V-V of FIG. 3.

Referring to FIG. 5, the vehicle light assembly 20 of FIG. 3 is shown having a housing 22 and an outer lens 24 which is connected to and may form a part of the housing 22. The housing 22 is generally fixed to the vehicle body and outer lens 24 may be connected to housing 22 in a conventional manner. Disposed within the housing 22 and outer lens 24 is a light source 26, a reflector 28, and an inner lens 30. The light source 26 may include one or more light emitting diodes (LEDs), incandescent bulbs, halogen bulbs, or other sources of light illumination. The reflector 28 is generally positioned to reflect light output from the light source 26 forward through the inner lens 30 and outer lens 24 to illuminate exterior of the vehicle 10. The light is output from the inner lens 30 within a beam towards the outer lens 24 and is transmit through the outer lens 24, provided the light is not blocked by dirt, moisture, such as ice or snow, or other light restricting mediums. The inner lens 30 and outer lens 24 may be made of a clear light transmissive polymeric material. The outer lens 24 may serve as a protective covering and may have a silicone material on the outer surface that is hydrophobic to repel oil and water.

The light assembly 20 may be configured as a low beam light assembly, a high beam light assembly, a combination of low and high light beam assemblies or may have three or more light beam intensities. The light assembly 20 may have different color light sources, e.g., RGB LEDs, to generate different color light outputs and may illuminate light output in a desired light sequence or pattern. Additionally, the housing 22 and outer lens 24 may include a plurality of light sources for multiple functions, such as headlight illumination, daylight running lamps, turn signals, flashers, vehicle ride service indicators, and other lighting functions.

The vehicle light assembly 20 includes the light sensor 32 extending through an opening 38 in an upper portion of the lens 24 and generally forward of lens 24 in a position so as to receive and sense light intensity of light output generated by light source 26 emitted externally from the outer lens 24. The light sensor 32 includes a light pipe 34 and light sensing 36 input shown as an aperture located near the proximal end of the light pipe 34 and optically coupled to the light pipe 34. The light sensor 32, and particularly the light sensing input, is located outside the outer lens 24 and is positioned at least partially in front of the outer lens 24 where light output is illuminated. Light output from the outer lens 24 enters light sensing input 36 and is transmitted through the light pipe 34 to a sensing element that senses the light intensity output. The sensing element is optically coupled to the light pipe 34 and may be located within housing 22. The light sensor 32 may include a light-dependent resistor (LDR) or other photo sensor.

The spray washer 40 likewise extends through the opening 38 in the top portion of the outer lens 24 to an outward extended position extending at least partially in front of the outer lens 24 so as to be able to spray a cleaning liquid via output head 44 onto the outer surface of outer lens 24 to clean dirt, snow, ice and other potentially light blocking materials from the outside of the outer lens 24. In addition, the spray washer 40 may spray a cleaning liquid onto the light sensing input 36 of the light sensor 32 to remove dirt, debris, ice, snow and other material that may be located on the light sensor 32, particularly at the light sensing input 36. Thus, the spray washer 40 is one embodiment of a lens cleaner. Both the light sensor 32 and washer 40 are shown connected to a motorized pop out control unit 44 that may actuate the sensor 32 and spray washer 40 forward to the deployed use positions and rearward to a retracted stored positions. It should be appreciated that one or both of the light sensor 32 and spray washer 40 may be fixed, and that one or both of the light sensor 32 and spray washer 40 may be movable. It should further be appreciated that other lens cleaners, such as one or more wipers, may be employed in place of or in addition to the spray washer 40.

Figure 4:
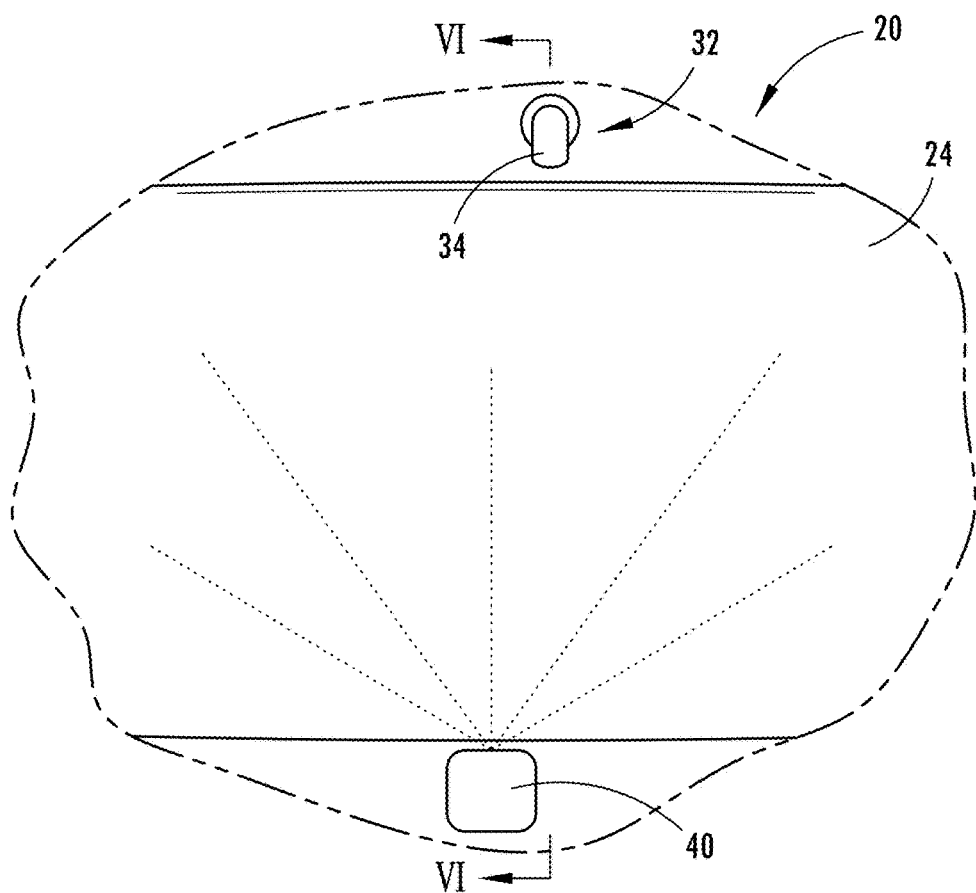
FIG. 4 is an enlarged front view of one of the light assemblies shown in FIGS. 1 and 2 with a light sensor and washer, according to another embodiment.
Figure 6:
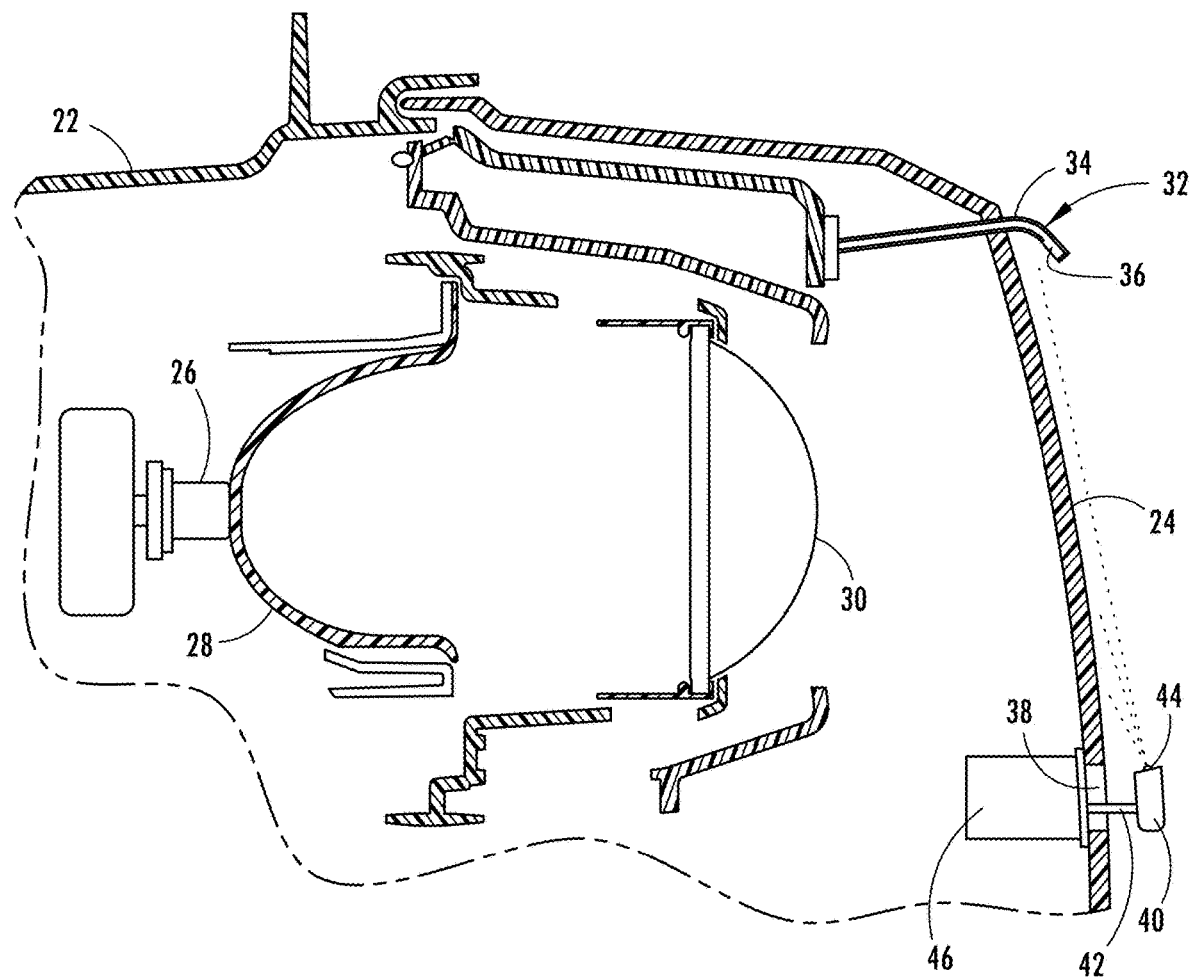
FIG. 6 is a cross-sectional view of the vehicle light assembly taken through line VI-VI of FIG. 4.

Referring to FIGS. 4 and 6, the light sensor 32 and spray washer 40 are shown in a different arrangement. In this embodiment, the light sensor 32 is located generally above the outer lens 24 of the lighting assembly 20 to sense light intensity of light output emitted through the outer lens 24, while the spray washer 40 is located below the outer lens 24. With the spray washer 40 located below the outer lens 24, the spray washer 40 may spray a cleaning liquid upwards and onto the outer surface of the outer lens 24. In addition, the spray washer 40 may spray a cleaning liquid onto the light sensing input 36 of the light sensor 32 to remove dirt, debris, ice, snow and other material that may be located on the light sensor 32, particularly at the light sensing input 36. In this embodiment, one or both of the light sensor 32 and spray washer 40 may be movable between a deployed outward position and a retracted stored position or may be fixed. In the specific embodiment shown, the spray washer 40 is connected to a movable or motorized control unit 46 to move the spray washer 40 between retracted and stored positions, and the light sensor 32 is fixed.

Figure 7:
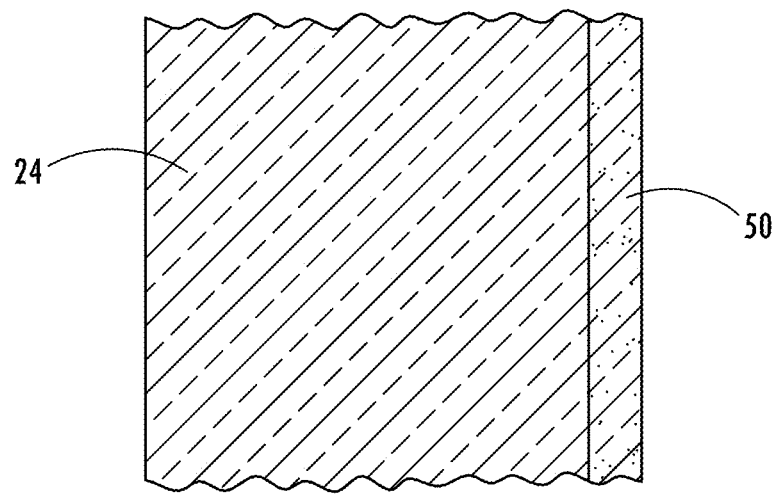
FIG. 7 is an enlarged cross-sectional view of outer section VII of FIG. 5 further illustrating the outer lens.

The outer lens 24 may include an optical silicone molded lens that has an oil/water repellent hydrophobic surface 50 molded on the outside surface as shown in FIG. 7. The oil/water repallant hydrophobic surface 50 is made of a material and pattern that repels oil and water so that the outer surface of the outer lens 24 stays cleaner and is easily sprayed clean with washer fluid from the spray washer 40. According to one embodiment, an optical silicone is used to form the hydrophobic surface 50 of the outer lens 24. According to one specific example, a moldable silicone such as Dow Corning's MS-1002 moldable silicone may be used having a 72 Shore A hardness. The outer surface of the lens 24 thereby has hydrophobic properties that repel water and help keep the outer outside surface of the outer lens 24 clear and clean. The outer surface of the outer lens 24 may also include a unique texturing with nibs that reduce the contact surface between the outer lens 24 and water droplets significantly reducing the surface energy enabling the water droplet to slide off the surface. The geometry and surface of the silicone material may repel water while minimizing contact to droplets of oil that will reduce dirt and grime.

Figure 8:
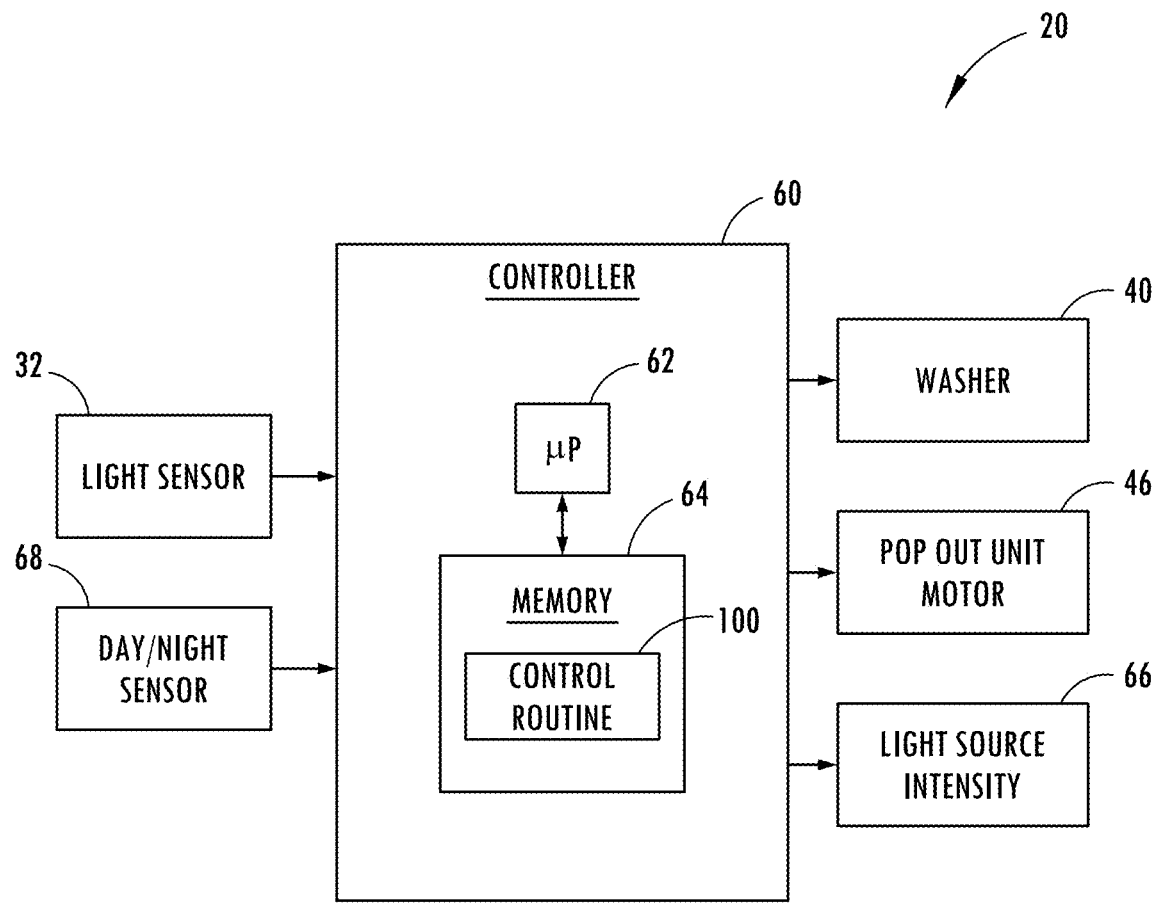
FIG. 8 is a block diagram illustrating controls for controlling the light output of the light assembly, according to one embodiment.

Referring to FIG. 8, an arrangement for controlling the light assembly 20 to sense light output from the light assembly and control the light output is illustrated, according to one embodiment. The light assembly 20 includes a controller 60 which receives as an input the sensed light measurement from the light sensor 32 and generates control signals to control each of the spray washer 40, the pop out unit motor 46 and the intensity of the light source 66. The controller 60 may include a microprocessor 62, or other control circuitry, and memory 64. Stored in memory 64 and executable by the microprocessor 62 is a control routine 100 for generating the control signals to control each of the spray washer 40, the pop out unit motor 46 and the light source intensity 66.

Figure 9:
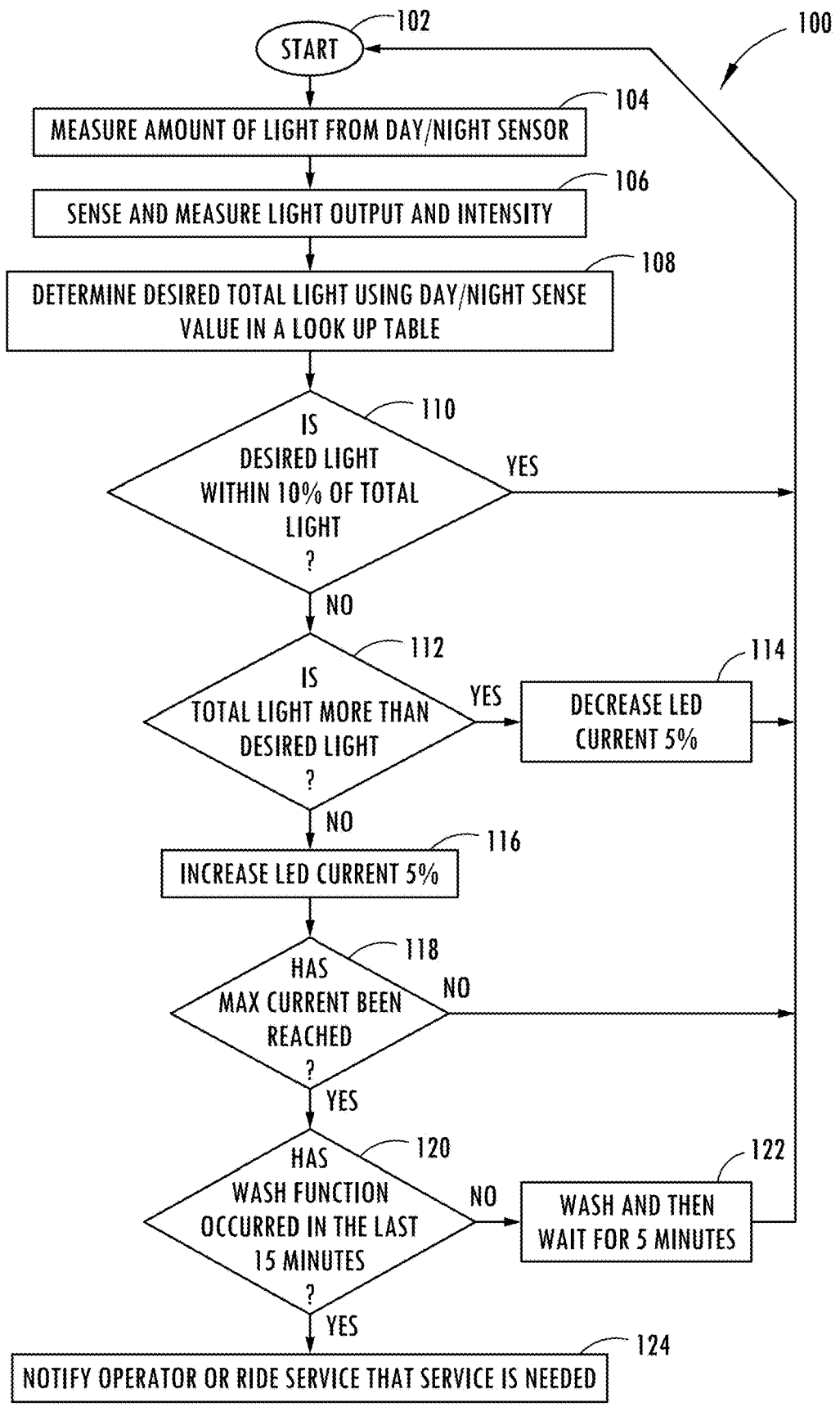
FIG. 9 is a flow diagram illustrating the routine for sensing and controlling light output of the vehicle light assembly, according to one embodiment.

Referring to FIG. 9, the control routine 100 for sensing light output and controlling the light assembly based on the sensed light is illustrated, according to one embodiment. The control routine 100 begins at step 102 and proceeds to step 104 to measure the amount of ambient light sensed from a day/night sensor. The sensed ambient light provides a baseline indication of the surrounding light form the sun and other lights illuminating the vehicle. Next, at step 106, routine 100 senses and measures the intensity of light output from the light assembly with the use of the light sensor. Routine 100 then proceeds to step 108 to determine the desired total light based on the day/night sense value using a look up table. Proceeding to decision step 110, routine 100 determines if the desired total light is within ten percent (10%) of the sensed total light and, if so, returns to step 102. If the desired total light output is not within ten percent (10%) of the sensed total light, routine 100 proceeds to decision step 112 to determine if the total light is more than the desired total light and, if so, decreases the light source current by five percent (5%), according to one embodiment, before returning to step 102. It should be appreciated that the light source may otherwise be controlled to adjust the light intensity, such as by controlling a pulse width modulated (PWM) signal.

Returning to decision step 112, if the total light output is not more than the desired light, routine 100 proceeds to step 116 to increase the LED current to the light source by five percent (5%). Next, at decision step 118, routine 100 determines if the maximum current has been reached and, if not, returns to step 102. If the maximum current has been reached, routine 100 proceeds to decision step 120 to determine if a wash function has occurred in the last fifteen minutes and, if not, performs a wash function with the spray washer, and then waits for five minutes before returning to step 102. As a result, the wash function is performed when the light source is at the maximum output level and additional lighting is needed. If the wash function has occurred in the last fifteen minutes while the light source is at the maximum current, routine 100 proceeds to step 124 to notify the operator or the ride service that service is needed.

Accordingly, the vehicle light assembly 20 advantageously provides for light sensing and control of the light source and a spray washer so as to detect a light blocking material on the lens and to take corrective action to increase the intensity of the light and/or wash the lens to remove the light blocking medium.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of controlling a vehicle exterior light assembly, comprising:

generating a light output through a lens from a light source located in a housing;

extending a light sensor from a retracted stored position to a deployed outward position at least partially in front of the lens;

sensing light intensity of the light output emitted from the lens with the light sensor in the deployed outward position; and adjusting with a controller intensity of light generated by the light source based on the sensed light intensity.

2. The method of claim 1 further comprising the step of activating a lens cleaner to clean the lens, wherein the controller controls the lens cleaner based on the sensed light intensity.

3. The method of claim 2, wherein the lens cleaner comprises a spray washer for spraying liquid on the lens.

4. The method of claim 1, wherein the light sensor is disposed outside the housing.

5. The method of claim 1, wherein the light sensor has a light sensing input outside of the housing and coupled to a light pipe which transmits the light to a sensing element within the housing.

6. The method of claim 1, wherein the controller adjusts current applied to the light source to adjust the intensity.

7. The method of claim 1, wherein the light sensor is disposed outside the housing.

8. The method of claim 7, wherein the light sensor comprises an extendible portion that extends and retracts.

9. The method of claim 1 further comprising an optical silicone layer formed on the lens.

10. The method of claim 1 further comprising the step of retracting the light sensor from the deployed outward position to the retracted stored position.

11. A method of controlling a vehicle exterior light assembly, comprising:

generating a light output through a lens from a light source located in a housing;

extending a light sensor and a lens cleaner from a retracted stored position to a deployed outward position at least partially in front of the lens;

sensing light intensity of the light output emitted from the lens with the light sensor in the deployed outward position;

adjusting with a controller intensity of light generated by the light source based on the sensed light intensity; and controlling with the controller the lens cleaner adapted to clean the lens, wherein the controller controls the lens cleaner based on the sensed light intensity.

12. The method of claim 11, wherein the lens cleaner comprises a spray washer for spraying liquid on the lens.

13. The method of claim 11, wherein the light sensor is disposed outside the housing.

14. The method of claim 11, wherein the light sensor has a light sensing input outside of the housing and coupled to a light pipe which transmits the light to a sensing element within the housing.

15. The method of claim 11, wherein the controller adjusts current applied to the light source to adjust the intensity.

16. The method of claim 11, wherein the light sensor is disposed outside the housing.

17. The method of claim 16, wherein the light sensor comprises an extendible portion that extends and retracts.

18. The method of claim 11 further comprising an optical silicone layer formed on the lens.

19. The method of claim 11 further comprising the step of retracting the light sensor and lens cleaner from the deployed outward position to the retracted stored position.

* * * * *